United States Patent
Amer et al.

(10) Patent No.: US 11,112,349 B2
(45) Date of Patent: Sep. 7, 2021

(54) METAL LOSS DETERMINATIONS BASED ON THERMOGRAPHY MACHINE LEARNING APPROACH FOR INSULATED STRUCTURES

(71) Applicant: Saudi Arabian Oil Company, Dhahran (SA)

(72) Inventors: Ayman Amer, Thuwal (SA); Ali Al Shehri, Thuwal (SA); Vincent Cunningham, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 200 days.

(21) Appl. No.: 16/513,168

(22) Filed: Jul. 16, 2019

(65) Prior Publication Data
US 2021/0018426 A1   Jan. 21, 2021

(51) Int. Cl.
*G01N 17/04* (2006.01)
*G01N 17/00* (2006.01)
(Continued)

(52) U.S. Cl.
CPC .......... *G01N 17/04* (2013.01); *G01N 17/006* (2013.01); *G06K 9/6267* (2013.01); *G06N 3/0418* (2013.01)

(58) Field of Classification Search
CPC ...... G01N 17/04; G01N 17/006; G01N 21/00; G01N 21/35; G01N 30/74; G06K 9/6267; G06N 3/0418
(Continued)

(56) References Cited

U.S. PATENT DOCUMENTS 4,647,220 A * 3/1987 Adams ................... G01N 25/72
                                                                        374/5
5,376,793 A * 12/1994 Lesniak ................ G01N 25/72
                                                                        250/330
(Continued)

FOREIGN PATENT DOCUMENTS

WO   WO-2020123505 A1 * 6/2020   ........... G05B 23/024

OTHER PUBLICATIONS

Chung et al., Thermographic Inspection of Internal Defects in Steel Structures: Analysis of Signal Processing Techniques in Pulsed Thermography, www.mdpi.com/journal/sensors; Sensors 2020, 20, 6015; doi:10.3390/s20216015 (Year: 2020).*
(Continued)

*Primary Examiner* — Patrick Assouad
*Assistant Examiner* — Sean Curtis
(74) *Attorney, Agent, or Firm* — Leason Ellis LLP

(57) ABSTRACT

A method for identifying metal wall loss in an insulated metal structure is provided. The method includes receiving thermograms of the outer surface of the structure using an infrared camera, applying filters to the thermograms using a first machine learning (ML) system, determining wall loss classifications based on outputs from the filters, validating the wall loss classifications by inspecting the structure, and training the first ML system using the validation results. Outputs of the first ML system and additional structural and environmental data are input to a second ML system that incorporates information from earlier states into current states. The second ML system is trained to estimate wall loss according to changes in the outputs of the first ML system and the additional data over time until a wall loss classification accuracy is reached. The metal wall loss is thereafter estimated using the first and second ML systems in coordination.

21 Claims, 12 Drawing Sheets

(51) Int. Cl.
*G06K 9/62* (2006.01)
*G06N 3/04* (2006.01)

(58) Field of Classification Search
USPC .......................................................... 324/700
See application file for complete search history.

(56) References Cited

U.S. PATENT DOCUMENTS

| | | | | |
|---|---|---|---|---|
| 5,491,409 | A * | 2/1996 | Flora | G01N 27/902 |
| | | | | 324/235 |
| 5,582,485 | A * | 12/1996 | Lesniak | G01N 25/72 |
| | | | | 250/330 |
| 6,194,902 | B1 * | 2/2001 | Kuo | G01N 17/00 |
| | | | | 324/535 |
| 6,344,741 | B1 * | 2/2002 | Giguere | G01N 17/006 |
| | | | | 324/225 |
| 6,394,646 | B1 * | 5/2002 | Ringermacher | G01J 5/0088 |
| | | | | 374/7 |
| 6,495,833 | B1 * | 12/2002 | Alfano | G01N 21/4795 |
| | | | | 250/330 |
| 6,570,379 | B2 * | 5/2003 | Crouzen | G01N 27/902 |
| | | | | 324/240 |
| 6,712,502 | B2 * | 3/2004 | Zalameda | G01J 5/62 |
| | | | | 374/124 |
| H2127 | H * | 10/2005 | Byrd | 374/121 |
| 8,596,861 | B2 * | 12/2013 | Kane | G01N 25/72 |
| | | | | 374/5 |
| 9,091,664 | B2 * | 7/2015 | Krause | G01N 27/9053 |
| 9,518,918 | B2 * | 12/2016 | Mann | G01N 21/3563 |
| 9,841,368 | B2 * | 12/2017 | Husebo | G01N 17/04 |
| 9,874,516 | B2 * | 1/2018 | Mann | G01N 17/04 |
| 10,139,372 | B1 * | 11/2018 | Amer | G01N 27/00 |
| 10,274,429 | B2 * | 4/2019 | Ouyang | G01N 21/71 |
| 10,401,278 | B2 * | 9/2019 | Shehri | G01N 21/3563 |
| 10,533,937 | B1 * | 1/2020 | Shehri | G01N 17/006 |
| 10,551,297 | B2 * | 2/2020 | Amer | G01N 25/72 |
| 10,620,115 | B2 * | 4/2020 | Shehri | G01N 17/00 |
| 10,643,324 | B2 * | 5/2020 | Al Shehri | G06K 9/6288 |
| 10,697,935 | B2 * | 6/2020 | Amer | B64C 39/024 |
| 10,768,094 | B2 * | 9/2020 | Amer | G06N 3/084 |
| 10,871,444 | B2 * | 12/2020 | Al Shehri | G01N 21/3581 |
| 10,908,068 | B2 * | 2/2021 | Amer | G06N 3/0445 |
| 2001/0042834 | A1 * | 11/2001 | Kenway | B27N 3/00 |
| | | | | 250/341.6 |
| 2002/0018510 | A1 * | 2/2002 | Murphy | G01N 25/72 |
| | | | | 374/45 |
| 2004/0130322 | A1 * | 7/2004 | Crouzen | G01B 7/10 |
| | | | | 324/229 |
| 2005/0098728 | A1 * | 5/2005 | Alfano | G01N 21/3581 |
| | | | | 250/341.8 |
| 2005/0135546 | A1 * | 6/2005 | Ponstingl | G01N 21/55 |
| | | | | 376/305 |
| 2005/0207468 | A1 * | 9/2005 | McCullough | G01N 25/72 |
| | | | | 374/5 |
| 2006/0114965 | A1 * | 6/2006 | Murphy | G01K 11/006 |
| | | | | 374/120 |
| 2007/0217672 | A1 * | 9/2007 | Shannon | G06K 9/00 |
| | | | | 382/152 |
| 2008/0107147 | A1 * | 5/2008 | Kollgaard | G01N 25/72 |
| | | | | 374/5 |
| 2009/0312956 | A1 * | 12/2009 | Zombo | F01D 5/288 |
| | | | | 702/34 |
| 2010/0100275 | A1 * | 4/2010 | Mian | B61L 1/20 |
| | | | | 701/31.4 |
| 2010/0107767 | A1 * | 5/2010 | Kane | G01N 25/72 |
| | | | | 73/592 |
| 2010/0266790 | A1 * | 10/2010 | Kusinski | B32B 5/26 |
| | | | | 428/34.6 |
| 2015/0346159 | A1 * | 12/2015 | Husebo | G01N 29/2418 |
| | | | | 73/597 |
| 2016/0305869 | A1 * | 10/2016 | Mann | G01N 17/006 |
| 2016/0371316 | A1 * | 12/2016 | Okanohara | G06N 3/0454 |
| 2017/0030825 | A1 * | 2/2017 | Goodwin | G01N 17/04 |
| 2018/0299392 | A1 * | 10/2018 | Villette | H04N 5/33 |
| 2018/0335404 | A1 * | 11/2018 | Amer | G01N 27/00 |
| 2018/0346737 | A1 * | 12/2018 | Beele | C09D 5/18 |
| 2018/0356333 | A1 * | 12/2018 | Shehri | G01R 27/28 |
| 2019/0003983 | A1 * | 1/2019 | Al-Omari | G01N 21/95 |
| 2019/0079031 | A1 * | 3/2019 | Safai | G01N 29/043 |
| 2019/0086365 | A1 * | 3/2019 | Amer | G01N 27/9006 |
| 2019/0094124 | A1 * | 3/2019 | Amer | G06N 3/0445 |
| 2020/0072744 | A1 * | 3/2020 | Al Shehri | G01N 21/3581 |
| 2020/0116625 | A1 * | 4/2020 | Amer | G01K 1/045 |
| 2020/0355601 | A1 * | 11/2020 | Amer | G06N 3/0445 |
| 2021/0018426 | A1 * | 1/2021 | Amer | G06N 3/0418 |
| 2021/0042911 | A1 * | 2/2021 | You | G06T 7/136 |
| 2021/0056406 | A1 * | 2/2021 | Aldabbagh | G06F 30/20 |
| 2021/0096529 | A1 * | 4/2021 | Aldabbagh | B25J 9/1674 |

OTHER PUBLICATIONS

Usamentiaga et al., Infrared Thermography for Temperature Measurement and Non-Destructive Testing, www.mdpi.com/journal/sensors; Sensors 2014, 14, 12305-12348; doi:10.3390/s140712305 (Year: 2014).*

Shen et al., Infrared Thermography Test for High Temperature Pressure Pipe, www.ndt.net/article/apcndt01/papers/1033/1033.htm (Year: 2020).*

Vavilov et al. Detecting corrosion in thick metals by applying active IR thermography. Proceedings of SPIE—The International Society for Optical Engineering—May 2012 (Year: 2012).*

N/a. Corrosion under insulation—AI Foresight use case, www.endila.com/post/ai-use-case (Year: 2020).*

Harik, Marc Anthony, "Characterization of Defects in Metal Sheets via Infrared Thermography" (2010). University of Kentucky Master's Theses. 32. https://uknowledge.uky.edu/gradschool_theses/32 (Year: 2010).*

Cadelano et al., Corrosion Detection in Pipelines Using Infrared Thermography: Experiments and Data Processing Methods. J Nondestruct Eval (2016) 35:49 DOI 10.1007/s10921-016-0365-5 (Year: 2016).*

Amer et al., Artificial Intelligence to Enhance Corrosion Under Insulation Spection. Abu Dhabi International Petroleum Exhibition & Conference. Abu Dhabi, UAE. Nov. 2020. (Year: 2020).*

Amer et al., MPWT19-15162 A Prediction and Inspection Technology for Detecting Corrosion Under Insulation. Materials Performance & Welding Technologies Conference & Exhbition 2019. (Year: 2019).*

Holland et al., Material Evaluation by Infrared Thermography. Center for Nondestructive Evaluation and Department of Aerospace Engineering, Iowa State University Copyright 2016 by Annual Reviews. (Year: 2016).*

Wang et al., Sub-surface metal loss defect detection using cold thermography and dynamic reference reconstruction (DRR). Structural Health Monitoring 1-16 The Author(s) 2021 (Year: 2021).*

Laguela et al., Prediction of depth model for cracks in steel using infrared thermography. Infrared Physics & Technology 71 (2015) 492-500. 2015 Elsevier B.V. (Year: 2015).*

Mohsin et al., A fuzzy logic method: Predicting corrosion under insulation of piping systems with modelling of CUI 3D surfaces. International Journal of Pressure Vessels and Piping 175 (2019) 103929. © 2019 Elsevier Ltd. (Year: 2019).*

Isoc et al., Intelligent Diagnosis of Degradation State under Corrosion. AIP Conference Proceedings 1019, 383 (2008); https://doi.org/10.1063/1.2953010 Published Online: Jun. 12, 2008 (Year: 2008).*

Shahimi, Muhammad Syamil. "Detection of Corrosion Under Insulation Using Infrared Thermography." (2013). 53 pages.

International Search Report and Written Opinion in Corresponding PCT Application No. PCT/US2020/042255 dated Nov. 9, 2020. 10 pages.

Jones, Robin Ellis. "Use of microwaves for the detection of corrosion under insulation." (2012).

* cited by examiner

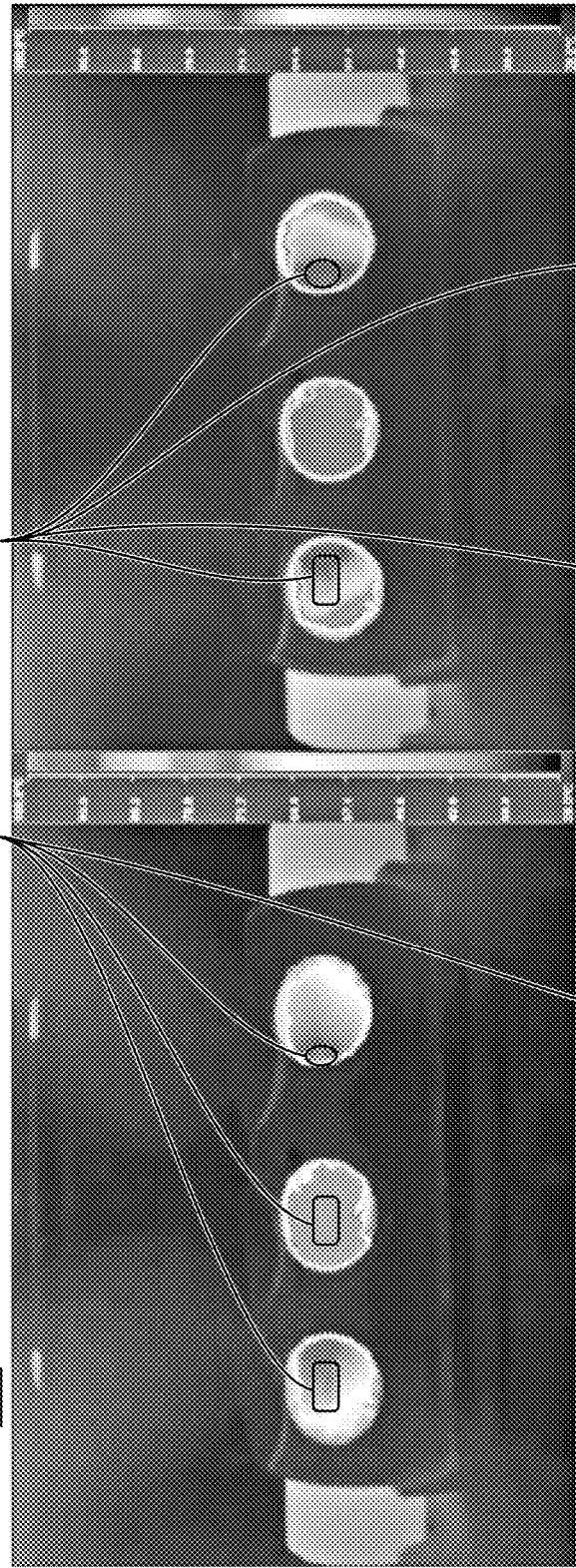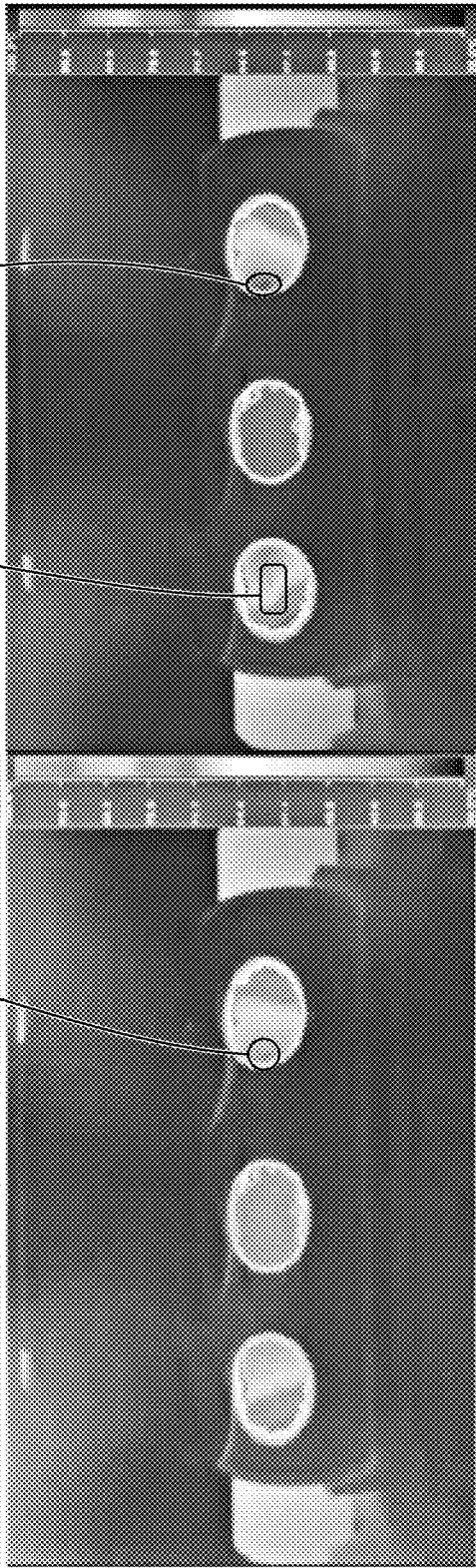
FIG. 6A  FIG. 6B  FIG. 6C  FIG. 6D $C_n$: Temperature Constants
$k$: Thermal Conductivity
$T_n$: Temperatures
$Q$: Heat (Energy) Transfer Rate
$q$: Heat Flux
$A$: Surface Area
$R$: Thermal Resistance
$L$: Length (Thickness)

$$C_2 = T_1 - \frac{T_1 - T_2}{\ln(r_1/r_2)} \ln r_1$$

$$C_1 = \frac{T_1 - T_2}{\ln(r_1/r_2)}$$

the temperature distribution in the pipe wall the heat flow rate : $dT/dr = C_1/r$ $$= \frac{T_1 - T_2}{2\pi L k \ln(r_2/r_1)}$$

$$Q = \frac{\Delta T}{R} \quad \text{where } \Delta T = T_1 - T_2$$

$$T_1 = C_1 \ln r_1 + C_2$$
$$T_2 = C_1 \ln r_2 + C_2$$

$$\frac{T_1 - T}{T_1 - T_2} = \frac{\ln(r/r_1)}{\ln(r_2/r_1)}$$

$$Q = q_r A = \left(-k \frac{dT}{dr}\right) 2\pi r L$$

$$Q = (-kC_1) 2\pi r L = -2\pi L k \frac{T_1 - T_2}{\ln(r_1/r_2)}$$

$$Q = 2\pi L \frac{T_1 - T_3}{\frac{\ln(r_2/r_1)}{k_A} + \frac{\ln(r_3/r_2)}{k_B}}$$

$$R_A = \frac{\ln(r_2/r_1)}{2\pi L k_A}$$
$$R_B = \frac{\ln(r_3/r_2)}{2\pi L k_B}$$

FIG. 9B

METAL LOSS DETERMINATIONS BASED ON THERMOGRAPHY MACHINE LEARNING APPROACH FOR INSULATED STRUCTURES

FIELD OF THE DISCLOSURE

The present disclosure relates in general to inspection technologies, and in particular to a method of metal loss determinations below covered, insulated structures based on a thermography machine learning approach.

BACKGROUND OF THE DISCLOSURE

Corrosion under insulation (CUI) is a type of corrosion that occurs due to moisture buildup on the external surface of insulated metal equipment/piping. If undetected, the results of CUI can lead to, for example, failure of pipes and attendant consequences, such as the shutdown of a process unit or an entire facility. The precursor of the corrosion is the accumulation of moisture and water patches underneath the insulating layers. The corrosion of steel or other materials under insulation initiates due to the presence of water, oxygen, and other corrodents. Once water and oxygen are present on a metal surface, corrosion takes place via metal dissolution (anodic reaction), which is balanced by the reduction of oxygen. The rate of CUI is determined by factors such as the availability of oxygen, contaminants in water, temperature, and heat transfer properties of the metal surface and wet/dry conditions of the surface.

The insulation type used can include, for example, fibrous material (e.g., glass/mineral wool) or cellular material (e.g., calcium silicate, poly urethane, or poly styrene). One insulation structure starts from the inner (pipe surface) and moves towards the periphery, such as coating the pipe with a compatible coating system, then insulation to insulate the pipe, and then a metal jacket cladding. The cladding acts as a protective barrier/weather shield. It helps prevent the insulation from getting exposed to rain and physical damages.

The main contribution of insulation to CUI is to provide an annular space for the retention or accumulation of water, with access to air (oxygen). Water may be introduced from external sources such as rainfall and wash downs, or from condensation. The chemistry and properties of the insulation also play a role in CUI. The insulation material may wick or absorb water, thus providing the required aqueous environment for electrochemical reactions to take place. Furthermore, the chemicals within the insulation, such as chlorides and sulfates, may leach into the electrolyte causing an acceleration in the corrosion.

The temperature of the metal surface plays an important role with regard to CUI. In general, increasing the temperature increases the rate at which electrochemical reactions take place, thus increasing the corrosion rate. At some point, though, further increases in temperature reduce the corrosion rate due to the lack of a corrosive environment as water evaporates. However, as water evaporates, the concentration of corrosive species on the metal surface increases, which increases the corrosion rate. Furthermore, high temperatures reduce the service life of protective coatings and sealants, which also increases the corrosion rate. In an open system, the oxygen concentration in water decreases with increasing temperature, thus decreasing the corrosion rate. In contrast, the corrosion rate in a closed system increases with increasing temperature.

It is in regard to these problems in the art that the present disclosure is directed to provide a technical solution for effective identification of metal loss sites and, in some implementations, remediation of same.

SUMMARY OF THE DISCLOSURE

According to an embodiment, a method for inspection of a first insulated structure is provided. The method includes: acquiring, by an infrared camera, first thermograms of a first outer surface of the first insulated structure; determining, by a prediction circuit, a first wall thickness loss of a first defect in a first metal wall of the first insulated structure using the first thermograms; and outputting, by the prediction circuit, the first wall thickness loss. The first metal wall is underneath a first insulation layer of the first insulated structure. The first insulation layer coincides with or is underneath the first outer surface. The prediction circuit is built from training data using a machine learning process. The training data includes second thermograms of a second outer surface of a second insulated structure having at least three distinct known second wall thickness losses of a corresponding at least three second defects in a second metal wall of the second insulated structure. The second metal is underneath a second insulation layer of the second insulated structure. The second insulation layer coincides with or is underneath the second outer surface.

In an embodiment, the method further includes: moving, by gripper wheels, the infrared camera from a first location on the first outer surface corresponding to the first thermograms, to a second location on the first outer surface different from the first location; and acquiring, by the infrared camera, third thermograms of the second location. The gripper wheels are attached to the infrared camera and in adhesive contact with the first outer surface.

In an embodiment, the method further includes: determining, by the prediction circuit, a third wall thickness loss of a third defect in the first metal wall using the third thermograms; and outputting, by the prediction circuit, the third wall thickness loss. The third wall thickness loss is different from the first wall thickness loss.

In an embodiment, moving the infrared camera includes autonomously moving the infrared camera along the first outer surface in a circumferential or longitudinal direction.

In an embodiment, the method further includes: determining, by a prediction circuit, a first size of the first defect using the first thermograms; and outputting, by the prediction circuit, the first size. The first size includes one or more of a length, a width, and an area. The at least three second defects have a corresponding at least three distinct known second sizes. The second sizes each include one or more of a length, a width, and an area.

In an embodiment, the method further includes heating, by a heat source, some of the first outer surface prior to acquiring some of the first thermograms. The heat source is attached to the infrared camera.

In an embodiment, the first insulated structure includes: a pipe including the first metal wall; and a cladding layer coinciding with or underneath the first outer surface. The first insulating layer is underneath the cladding layer.

In an embodiment, the machine learning process includes: applying, by a training circuit, filters to the second thermograms; determining, by the training circuit, wall thickness loss classifications of the at least three second defects based on output from the filters; and validating, by the training circuit, the wall thickness loss classifications using the known second wall thickness losses.

In an embodiment, the machine learning process further includes: outputting, by the training circuit, the validated wall thickness loss classifications; and building, by a machine learning circuit, the prediction circuit from the validated wall thickness loss classifications.

According to another embodiment, a system for inspection of a first insulated structure is provided. The system includes: an infrared camera for acquiring first thermograms of a first outer surface of the first insulated structure; and a prediction circuit for determining a first wall thickness loss of a first defect in a first metal wall of the first insulated structure using the first thermograms and outputting the first wall thickness loss. The first metal wall is underneath a first insulation layer of the first insulated structure. The first insulation layer coincides with or is underneath the first outer surface. The prediction circuit is built from training data using a machine learning process. The training data includes second thermograms of a second outer surface of a second insulated structure having at least three distinct known second wall thickness losses of a corresponding at least three second defects in a second metal wall of the second insulated structure. The second metal is underneath a second insulation layer of the second insulated structure. The second insulation layer coincides with or is underneath the second outer surface.

In an embodiment, the system further includes gripper wheels for moving the infrared camera from a first location on the first outer surface corresponding to the first thermograms, to a second location on the first outer surface different from the first location. The gripper wheels are attached to the infrared camera and are in adhesive contact with the first outer surface. The infrared camera is further for acquiring third thermograms of the second location.

In an embodiment, the prediction circuit is further for: determining a third wall thickness loss of a third defect in the first metal wall using the third thermograms; and outputting the third wall thickness loss. The third wall thickness loss is different from the first wall thickness loss.

In an embodiment, the gripper wheels are further for autonomously moving the infrared camera along the first outer surface in a circumferential or longitudinal direction.

In an embodiment, the system further includes: a sliding carrier for attaching the infrared camera to the gripper wheels; slide guides for guiding movement of the sliding carrier along the first outer surface in a circumferential or longitudinal direction; and suction pads for stabilizing the slide guides with respect to the first outer surface.

In an embodiment, the prediction circuit is further for: determining a first size of the first defect using the first thermograms; and outputting the first size. The first size includes one or more of a length, a width, and an area. The at least three second defects have a corresponding at least three distinct known second sizes. The second sizes each include one or more of a length, a width, and an area.

In an embodiment, the system further includes a heat source for heating some of the first outer surface prior to acquiring some of the first thermograms. The heat source is attached to the infrared camera.

In an embodiment, the first insulated structure includes: a pipe including the first metal wall; and a cladding layer coinciding with or underneath the first outer surface. The first insulating layer is underneath the cladding layer.

In an embodiment, the system further includes a training circuit for: applying filters to the second thermograms; determining wall thickness loss classifications of the at least three second defects based on output from the filters; and validating the wall thickness loss classifications using the known second wall thickness losses.

In an embodiment, the training circuit is further for outputting the validated wall thickness loss classifications, and the system further includes a machine learning circuit for building the prediction circuit from the validated wall thickness loss classifications.

In an embodiment, the system further includes a wireless communication device for communicating between the infrared camera and the prediction circuit. The wireless communication device is attached to the infrared camera.

Any combinations of the various embodiments and implementations disclosed herein can be used. These and other aspects and features can be appreciated from the following description of certain embodiments of the invention and the accompanying drawings and claims.

BRIEF DESCRIPTION OF THE DRAWINGS

FIG. 6, which includes FIGS. 6A-6D, is a set of color thermographic images (or thermograms) of the insulated pipe of FIGS. 5A-5C, illustrating several areas of thermal flux deflection corresponding to the defects shown in FIGS. 5A-5C.

FIGS. 9A-9B are schematic diagrams and thermal equations of an insulted pipe geometry and corresponding equations for the heat transfer rate in the presence of an abnormality for a steady temperature profile on a radial axis of the pipe.

Figure 1:
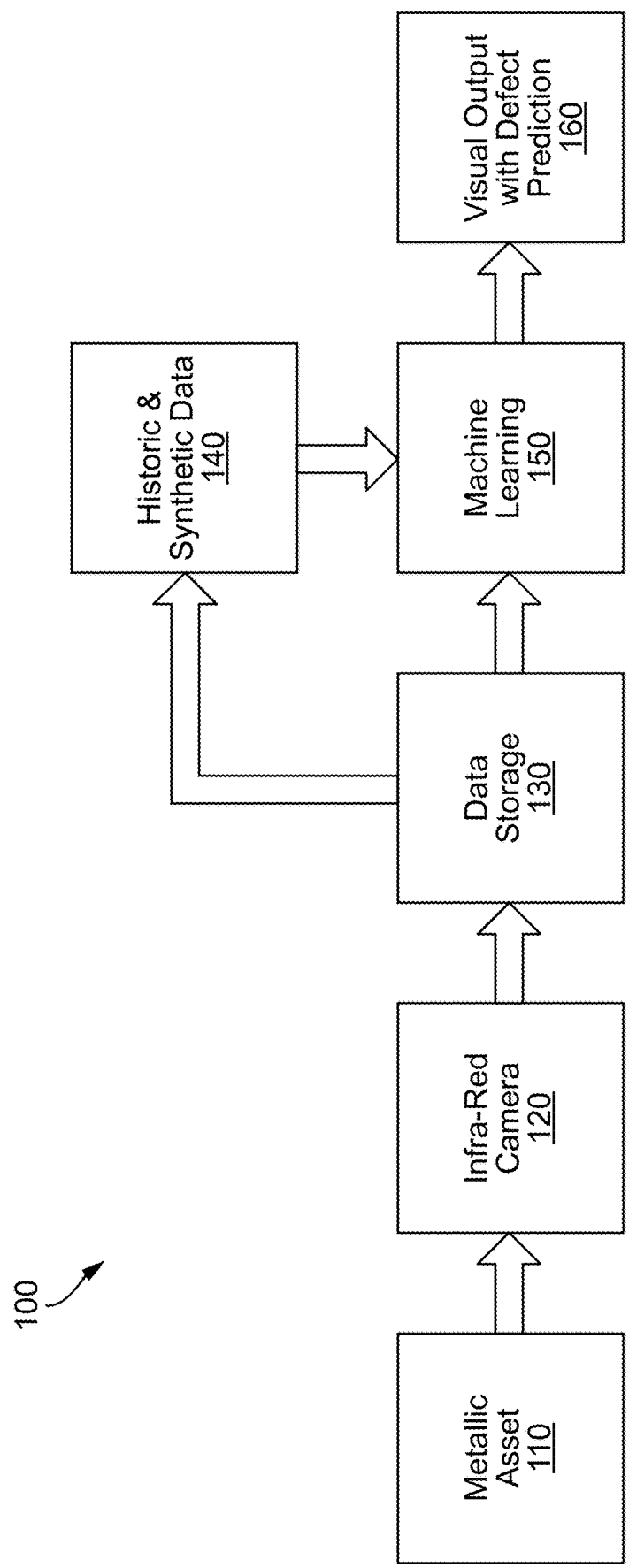
FIG. 1 is a block diagram of an example technique for determining metal loss of an insulated structure using infrared thermography (IRT) and machine learning, according to an embodiment of the present invention.

It is noted that the drawings are illustrative and not necessarily to scale.

DETAILED DESCRIPTION OF CERTAIN EMBODIMENTS OF THE DISCLOSURE

Embodiments of the present disclosure are directed to determining metal loss of insulated structures, such as pipes and storage tanks. Example techniques are based on thermography combined with a machine learning approach. According to an embodiment, a machine learning training system includes an expert system module. The expert system module is configured to determine correlations between a set of thermograms. The thermograms are generated, for example, by a thermal stimulation of modeled structural elements (such as portions of insulated pipe) having defects representative of different degrees of corrosion, as captured by an infrared camera (or other suitable infrared sensor). The defects can be simulated (e.g., manufactured) or actual, and represent different sizes and depths of structural wall loss. A machine learning prediction system is communicatively coupled to the training system and the inspection apparatus. The prediction system is adapted to receive thermograms generated by the inspection apparatus and to detect quantitative parameters of defects. In addition, the prediction system identifies the wall loss percentage in the insulated structure without removing the insulation by using the thermal signature of the scanned area.

According to some embodiments, stripping the insulation from the metal pipe or other metal structure is not required for detection or prediction purposes. This is because the thermal energy being detected penetrates the insulator material and reflects back with useful indications about the existence of water or moisture contamination. These disclosed solutions are cost effective since stripping the insulation can be limited to only those locations identified as likely to be corroded or otherwise in need of maintenance based on the observed reflection spectra.

According to some embodiments, an integrated inspection system is provided. The inspection system includes a method and an apparatus. This inspection system is based on thermography and a machine-learning model able to detect and quantify surface and bulk defects as well as identify the wall loss percentage cause by CUI. This inspection takes place over scanned areas of insulated structures without removing the insulation. The insulated structures can include, for example, pipelines, pressure vessels, or storage tanks. In some embodiments, the system has autonomous inspection of the full length (longitudinal) and width (circumferential) of the insulated structure. In addition, the system has quantitative determination of defects using a coupled mechanistic and machine learning approach.

A number of different machine learning algorithms in different combinations can be used without limitation. In some embodiments, the machine learning methodology is applied to thermographic imaging for determining metal loss in an insulated structure. Artificial intelligence (AI) uses machine learning (ML) and deep learning (a subset of machine learning) to create intelligent systems. Machine learning is used to make predictions based on its ability to learn from previous data (such as training data). This previous/historical data is fit to different models using algorithms. There are several known algorithms that are used. These include (but are not limited to) convolutional neural networks (CNNs), recurrent neural networks (RNNs), ensemble learning methods such as adaptive boosting (or AdaBoost) learning, decision trees, support vector machines, and any other supervised learning algorithm.

One embodiment of a machine learning process includes a combination of a CNN and an RNN. For example, CNNs are useful for stratifying thermal images into abstraction levels according to image topology, while RNNs are useful for detecting patterns over time. Both factors are important, as embodiments are directed to detecting temperature gradients and determining their development over time. In addition, in some embodiments, boosting algorithms, such as AdaBoost, can be used in conjunction with CNNs and RNNs to achieve higher accuracies at the expense of more computational time. Since mistakes can be costly, increasing accuracy at the sacrifice of computational time can be an acceptable trade-off. In addition, boosting can help in the designing phase of CNNs. Hence, a secondary goal of boosting is to aid in selecting the right architectures for CNNs and RNNs.

According to an embodiment, a nondestructive testing (NDT) technique using infrared (IR) radiation for metal loss detection of insulated structures based on a machine learning approach is provided. Defects in the insulator and wet areas have different thermal signatures, and IR is an effective method to detect thermal gradient when an insulator is compromised (wet insulation and/or defects). In addition, the spectra of the reflected signal will reveal information about the surface geometry underneath the insulator due to the thermal signatures. In an embodiment, the difference in thermal gradients provided by the different metal thicknesses (i.e., thickness variations due to corrosion) transferred to the surface of the asset are used to determine the corresponding extent of corrosion. For this, AI (more specifically, machine learning) is used because similarities/features of the thermal gradients associated with, for example, metal loss or insulation defects/water, can be identified in the resultant patterns using the ML technique. As the algorithm learns more over time and experience (increased number of measurements), the accuracy and prediction of the metal loss thickness and CUI improve.

According to some embodiments, inspection by infrared thermography (IRT) is used as a first detector of defects for insulated metal structures. However, while IRT is nondestructive, it lacks sufficient sensitivity by itself to do more than detect the presence of a defect. IRT alone provides little information on the defect's sizing (e.g., length, width, area, shape), location (e.g., depth, amount of wall loss), or the nature of corrosive media (e.g., water) that might be entrapped inside the defect. IRT includes two categories: passive thermography and active thermography. Passive thermography does not use an active heat source and is ideal when the subject has a different thermal signature relative to the surroundings or background. Active thermography, on the other hand, uses an external energy (heat) source (e.g., IR) to help "illuminate" the insulated structure to thermographic imagers. Active thermography uses the heat source to add thermal contrast to the subject versus the surroundings or background.

Active thermography is useful, for example, when the desired or required sensitivity (such as thermal contrast between the material and the defect) cannot be reached using passive thermography. The external stimulation of the material is induced to produce an internal heat flux. Subsurface defects will affect the heat diffusion and produce the corresponding thermal contrast on the top/skin (or outermost) surface. According to some embodiments, IRT is combined with machine learning techniques to allow the detection and characterization of internal defects by analyzing alterations or contrasts in the thermal pattern of the sample surface. This is performed without removal of the insulation or other protective layers (such as cladding) and allows a thermal inspection and metal loss detection and characterization.

This is in contrast to other practices of detecting CUI, which require stripping the insulation (and other protective layers, such as exterior cladding) from vulnerable or damaged portions of piping and performing inspections (such as visual, radiographic, or ultrasonic). There destructive testing practices offer no effective monitoring and predictive techniques available without removing the insulation layer. Instead, such destructive practices use expensive and lengthy risk-based inspections by corrosion engineers based on visual inspections and historical maintenance data. Visual inspection is costly and time consuming and requires removing the insulation to touch the pipe and inspect using procedures such as ultrasound testing. In addition, radiography involves bulky devices and has its safety issues (e.g., X-rays and/or gamma rays), and needs extra supportive tools to conduct inspections, which increase the time, cost, and safety of such inspections.

According to some embodiments, a system and method for nondestructive inspection of a surface of an insulated structure for defects is provided. These techniques determine the metal wall loss under the insulation and include an inspection apparatus having a heating device for heating a section of the surface of the structure. They also include an infrared camera for receiving infrared radiation from the insulated surface in response to the heating. They further include a controller configured to generate thermograms from the received infrared radiation, and a communication device.

According to some embodiments, a thermography system is integrated with a machine learning approach applied to time-based temperature change/gradient information for metal loss detection over time. This allows the accurate prediction and/or detection of, for example, CUI in insulated structures. It also allows the accurate characterization (e.g., sizing, location, depth, cause) of such defects in insulated structures. Further embodiments provide for using a clamp configuration (adhesive mechanism) of wheel composite grippers. This both confines the thermography system in one place while imaging and allows the system to move longitudinally and/or circumferentially along the insulated structure between imaging. In some embodiments, machine learning techniques are applied to time-based temperature change/gradient information to determine metal loss and areas with truly anomalous behavior.

FIG. 1 is a block diagram of an example technique 100 for determining metal loss of an insulated structure (or metallic asset 110) using infrared thermography (IRT) and machine learning, according to an embodiment of the present invention. The technique 100 includes a metallic asset 110 to be inspected in a nondestructive fashion. The metallic asset 110 can be, for example, a pipe, storage tank, pressure vessel, or the like. The metallic asset 110 has an insulated covering (such as an insulation layer or layers), and possibly an exterior protective coating or layer, such as a cladding layer.

The inspection takes place with a thermographic (e.g., infrared or IR) camera 120, such as a photographic device capable of making images out of received thermal radiation from a scene (such as of the asset 110). The thermal radiation can be a subset of the IR spectrum (e.g., thermal IR), such as electromagnetic radiation having a wavelength between 3 micrometers ($\mu m$) and 15 $\mu m$. The metallic asset 110 is located in front of the passive IR camera 120 (thermal camera), where the input to the camera 110 is the temperature emissions/reflections of the asset 110. In an embodiment, a FLIR Systems Industrial thermographic camera is used for the IR camera 120. Images from the IR camera 120 are stored in data storage 130, such as a network-accessible storage device (e.g., disk drive, flash drive). The output of the camera 120 is an image containing a heat map of the asset 110. This image (data) is stored in the data storage 130. This and other such images are sent to a previously trained machine learning module 150 for analysis.

In an example measurement and analysis procedure, the IR camera 120 is positioned in front of the asset 110, where the camera 120 is focused on the area of interest. The camera 120 captures a video/image sequence of the asset 110 that displays the thermal behavior (e.g., thermal gradient) of the asset 110. In an embodiment, the IR camera 120 is set to capture an image of the asset 110 every two seconds over time periods ranging from 10 minutes to 30 minutes. In an example test, fluctuations in the temperature caused by changes in pressure and flow (of the liquid in the pipe) are simulated by using an electric heating blanket whose temperature fluctuated in a controlled manner by up to 30% of the maximum temperature over the acquisition period.

The data (e.g., raw thermal images/videos of the asset 110) is saved as data sets on data storage 130 and used as input to the machine learning module 150 to analyze the images over time. The machine learning module 150 is trained to detect and predict corrosion on insulated structures (such as the metallic asset 110) using historic data 140 acquired (and validated) from earlier testing and inspections of such assets. The historic data 140 is also stored in a network-accessible non-transitory storage device such as a disk drive. The newly-acquired thermograms of the metallic asset 110 from the IR camera 120 can also get added to the historic data 140, such as for future training after any corresponding defect, anomaly, or abnormality is verified or validated.

In an embodiment, the historic data 140 further includes synthetic data 140, which is also used to train the machine learning module 150. The historic data 140 can be, for example, actual thermograms from other cameras, systems, or time periods, of situations useful for training the machine learning module 150. By contrast, the synthetic data 140 can be, for example, simulated conditions or thermograms, such as of simulated anomalous or abnormal situations. The synthetic data 140 can nonetheless be useful for training the machine learning module 150 to predict actual anomalous or abnormal situations in insulated structures.

The machine learning module 150 can be all or part of a computing device (such as a laptop, a workstation, a tablet, part of a server, or a dedicated hardware circuit, as in an FPGA or ASIC). The images (or thermograms) recorded in the data storage 130 are uploaded into the machine learning module 150 using, for example, a wired or wireless network accessible to the computing device hosting the machine learning module 150. The machine learning module 150 implements a machine learning algorithm to process the image data (thermograms) from the data storage 130. The machine learning module 150 detects and predicts (including determining the extent of) defects, anomalies, and other abnormalities of the metallic asset 110 (or its insulation or protective outer layers) from the uploaded thermograms. The machine learning module 150 is trained using historic and synthetic data 140. As such, the machine learning module 150 learns to recognize anomalous or abnormal temperature patterns in the thermograms indicative of corrosion damage of the metallic asset 110 (or of defects or water in the insulation).

In some embodiments, the machine learning module 150 is trained using known and controlled data (such as thermal gradients from pipes with known defects and clean pipes with no defects). In one such embodiment, to enhance the accuracy of the machine learning module 150, synthetic data 140 is generated for training purposes. The synthetic data 140 includes, for example, images with known superimposed thermal defects at different angles and orientations. The accuracy of the machine learning module 150 depends significantly on the quantity, quality, and variety of the data in the training sets.

The technique 100 further includes visual output with defect predictions 160. The machine learning module 150, having trained on the different training data, applies the training to real thermograms to detect, determine the extent, and predict corrosion of the metallic asset 110 and other undesired structural concerns (such as wet or damaged insulation). These results 160 are output visually to help with inspection, repair, and preventative actions of the metallic asset 110. The output 160 of the machine learning module 150 provides useful information such as the likelihood of corrosion and other defects along with highlighting areas where abnormalities/anomalies are predicted to occur. In an embodiment, the output 160 of the machine learning module 150 is an image containing the original heat map (thermogram) of the asset 110 with the prediction profile for metal loss along with any abnormalities/anomalies.

Figure 2:
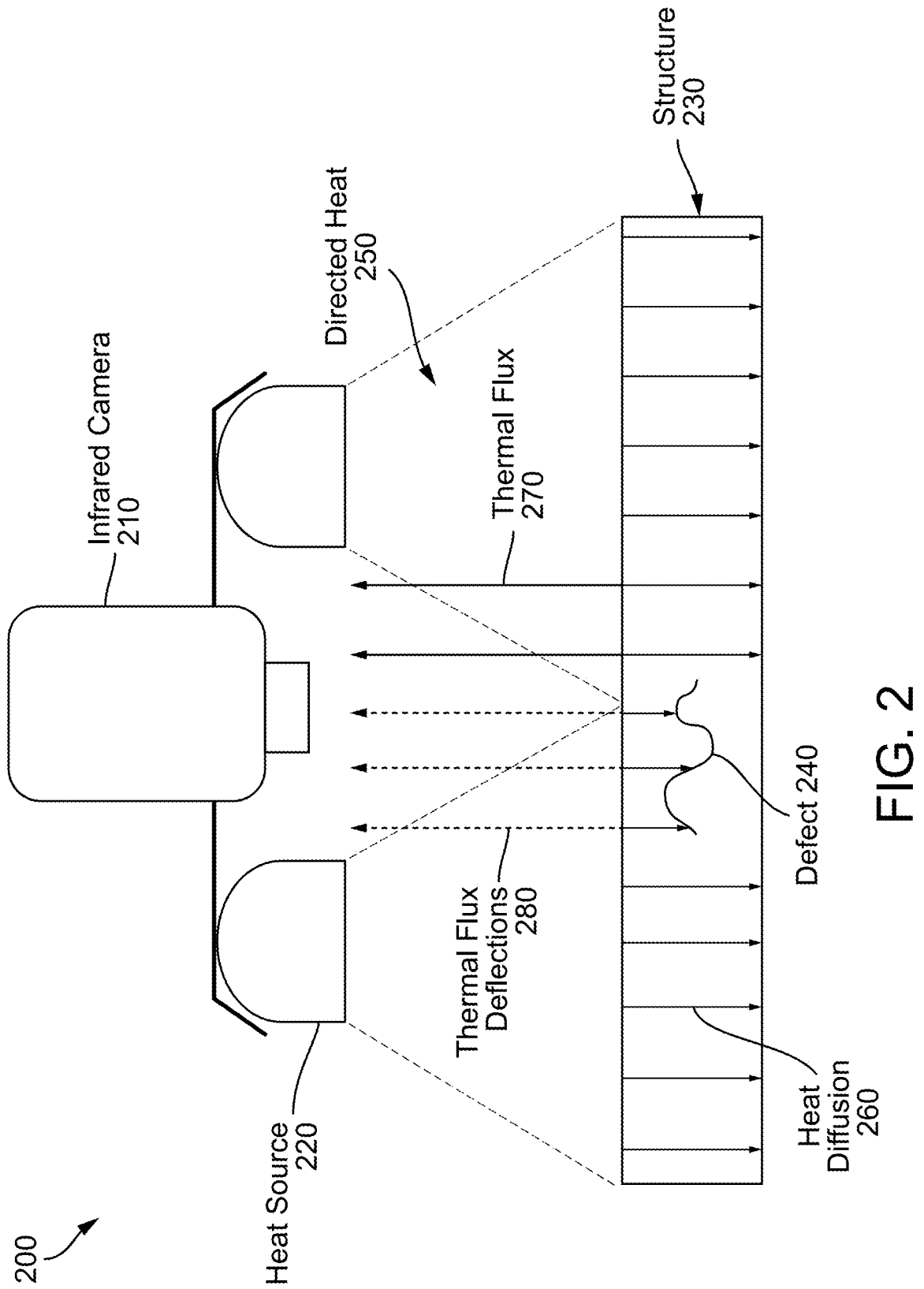
FIG. 2 is a schematic illustration of an example system for determining metal loss of an insulated structure using IRT and machine learning, according to an embodiment of the present invention.
Figure 3:
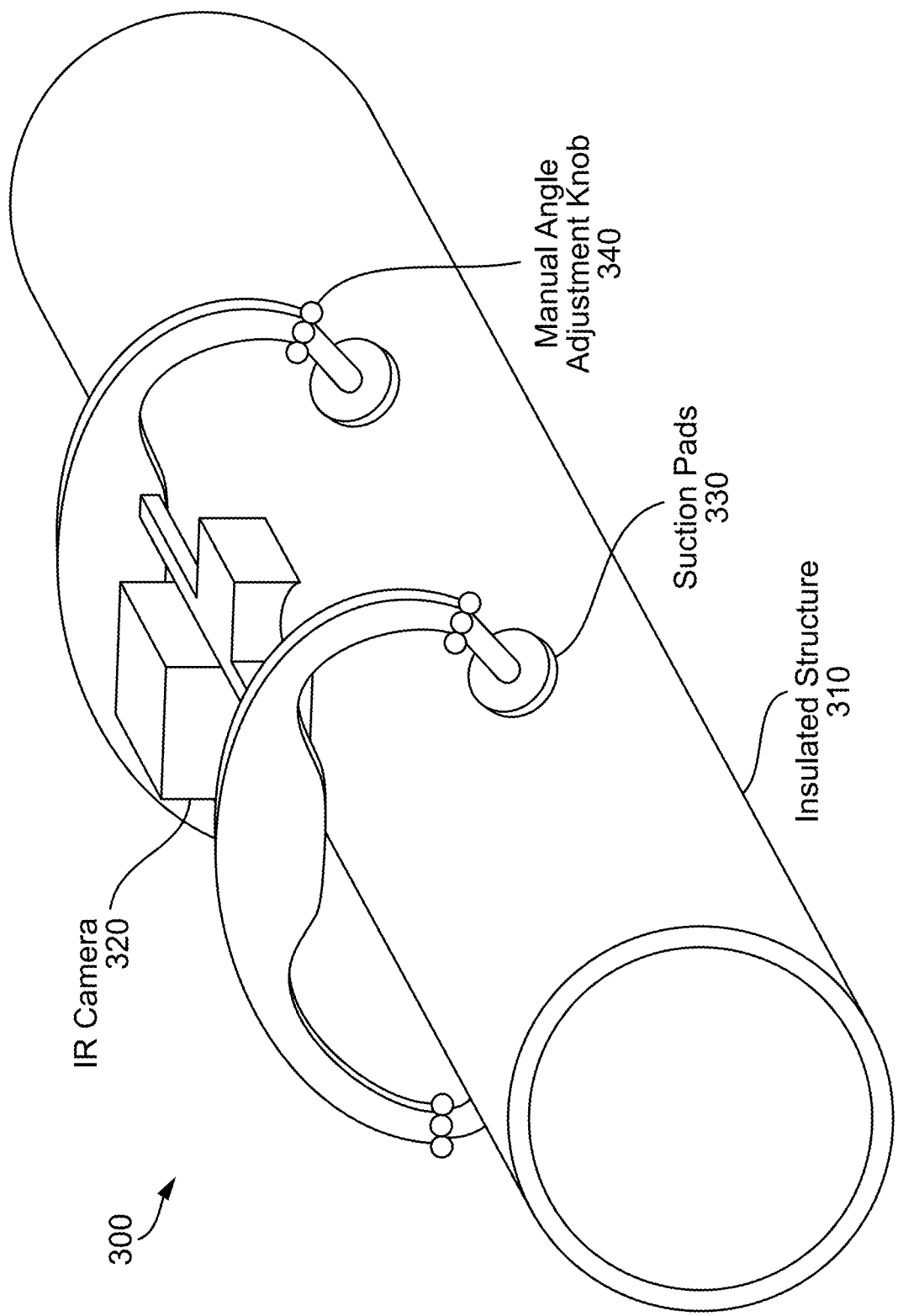
FIG. 3 is an oblique view of an example apparatus for determining metal loss of an insulated structure using thermography and machine learning, according to another embodiment of the present invention.
Figure 4:
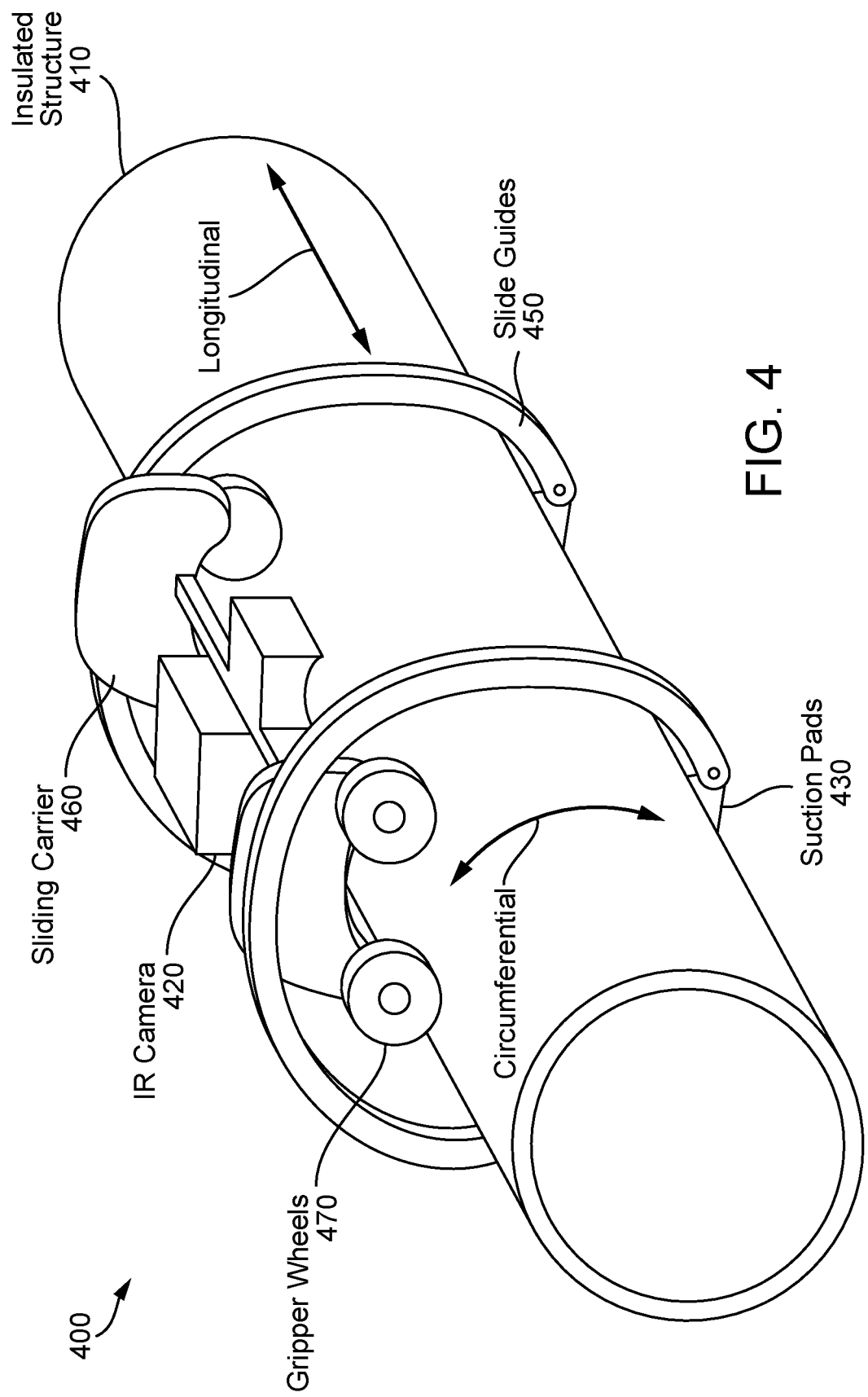
FIG. 4 is an oblique view of an example apparatus for determining metal loss of an insulated structure using thermography and machine learning, according to yet another embodiment of the present invention.

FIGS. 2-4 illustrate different inspection apparatuses for an insulated metal pipe (or other insulated metal structure). The apparatuses use IR detection integrated with a prediction system for performing metal-loss determination and obtaining other defect information. The metal loss information is based on a thermal signature analysis of the targeted insulated structure.

FIG. 2 is a schematic illustration of an example system 200 for determining metal loss of an insulated structure 230 using IRT and machine learning, according to an embodiment of the present invention. For ease of illustration, the structure 230 (e.g., pipe, storage tank) is shown without the insulation and other protective layers. The system 200 includes an infrared camera 210 and one or more heat sources 220 (such as heat lamps) directing heat 250 (infrared energy) to the insulated structure 230. The insulated structure 230 has a defect 240, such as corrosion having a thickness approximately 50% that of the thickness of the structure 230. The directed heat 250 contacts the structure 230 (through the insulation) and diffuses 260 throughout the structure 230. This produces a thermal flux 270 emanating from the structure 230 back to the infrared camera 210. The infrared camera 210 senses the thermal flux 270 (as infrared radiation) and generates corresponding thermograms from the sensed thermal flux.

The portion of the structure 230 corresponding to the defect 240 also has thermal flux, but the thermal flux is deflected 280 by the defect 240. This deflection can cause, for example, elevated temperatures compared to the surroundings, which can be detected by the infrared camera 210. In addition, the more extensive the defect (higher wall thickness loss), the higher the elevated temperatures, which allows the wall thickness loss to be more precisely estimated based on the thermographic signature. The thermal flux deflections 280 are sensed by the infrared camera 210, and have different alterations or contrasts compared to the thermal flux 270 in portions of the structure 230 not affected by the defect 240. The subsurface defect 240 affects the heat diffusion 260 and produces a corresponding thermal contrast (from the thermal flux deflections 280) detected by the infrared camera 210 and captured in its corresponding thermograms. With the aid of machine learning from such defects on similar structures, the system 200 uses a prediction module to determine the size, shape, depth, and other characteristics of the defect 240 from the thermal flux deflections 280 compared to the other thermal flux 270.

In further detail, a machine learning training system includes an expert system module and a prediction module. The modules can be, for example, dedicated hardware circuits (e.g., FPGA, ASIC), programmable logic (e.g., driven by firmware or software), or the like, configured to carry out their assigned functions. The expert system module is configured to determine correlations between a set of thermograms generated by a thermal simulation of modeled structural elements with defects having different wall thickness losses (such as at least three distinct wall thickness losses). The prediction module is configured to apply the training from the expert system module to new thermograms to determine the characteristics of any defects to the structure beneath the insulation. In one embodiment, the prediction module is communicatively coupled to the expert system module and the inspection system 200. The prediction module is adapted to receive thermograms generated by the inspection system 200 and to determine quantitative parameters of defects 240. The inspection system 200 further identifies the wall loss percentages in the insulated structure 230 without removing the insulation (or other protective layers) by using the thermal signature of the scanned area.

In an embodiment, the expert system module and the prediction module are implemented on a computer system. The computer system can be, for example, a stationary computer (such as a workstation or desktop computer) or a portable computer, such as a tablet, a laptop, a smart phone, or any other portable computing device capable of executing programs used for training a machine learning algorithm to detect CUI. The computer system is communicatively coupled to a database that is used for storing the thermograms on a long-term basis. Since many thermograms are taken at various locations on the structure and over extended periods of time (e.g., minutes or several hours), the thermogram datasets can demand significant memory resources of the computer system (e.g., in the gigabyte (GB) or terabyte (TB) range). Periodic archival from the computer system to the database can be performed to free up memory or storage in the computer system.

In an embodiment, a convolutional neural network (CNN) is used to hierarchically classify the captured thermogram data. This is followed by processing thermogram data captured over a significant duration of time using a recurrent neural network (RNN). In some implementations, a boosting algorithm can be used in conjunction with the CNN and RNN in order to achieve higher accuracies. While the boosting algorithm increases the overall number of computations, and thus increases computational time, additional accuracy can be a more significant factor due to the high cost of misidentification.

The CNN learns by validation and backward propagation. In an embodiment, after training, the CNN is able to accurately classify areas of an input thermogram into corresponding classifications (such as preset classifications) based, for example, on extent of wall thickness loss, length (and/or width), area (such as surface area), to name a few. While the CNN is an efficient and useful methodology for stratifying input images into abstraction levels according to the thermogram image topology, it is not as well suited for detecting patterns over time. Accordingly, in an embodiment, an RNN is used in association with the CNN to improve time-based pattern recognition.

The RNN can be used to detect changes to thermograms over time, and to account for environmental variables. These variables can be introduced as parameters into the RNN along with the thermogram data. For instance, the distance between the IR camera and the insulated structure can be one such variable.

In some embodiments, a boosting algorithm, such as Adaboost, can be used in conjunction with CNNs and RNNs to achieve higher accuracies at the expense of additional computation. Boosting can be used for combining and improving weak learners into strong learners. Weak learners are machine learning algorithms that, even after training, have a high error rate identification. Adaboost combines the output of the weak learning algorithms into a weighted sum that represents the final output of the boosted classifier. The weight of any given algorithm can be based on the accuracy of that algorithm. While CNNs and RNNs can generally be trained to be strong learners, boosting can improve accuracy, which helps reduce costly mistakes. Increasing accuracy at the sacrifice of computational time can be an acceptable trade-off. In addition, boosting can be useful in the designing phase for testing CNNs and RNNs.

FIG. 3 is an oblique view of an example apparatus 300 for determining metal loss of an insulated structure 310 using thermography and machine learning, according to another embodiment of the present invention. The apparatus 300 includes an infrared (IR) camera 320, four suction pads 330, and four manual angle adjustment knobs 340. The IR camera 320 includes the thermographic imaging system. In one embodiment, the IR camera 320 includes heat sources for performing active thermography of the insulated structure 310.

In further detail, the apparatus 300 illustrated in FIG. 3 is a system for the detection of defects in insulated structures. In one embodiment, the system includes an IR camera 320, a power supply, an electronics box, and a heating source. These subsystems are connected mechanically through a chassis clamping structure including the suction pads 330 and the angle adjustment knobs 340. The clamping structure has, for example, different curvature characteristics (available, e.g., through the angle adjustment knobs 340) to adapt to different circumferential sizes of pipes 310 or other insulated structures. The apparatus 300 of FIG. 3 illustrates a fixed structure using latching arms terminated with suction pads 330 that can be attached firmly to the pipe 310 underneath through a vacuum. This enables the inspection to be performed on insulated structures in various positions, such as horizontal pipelines and vertical surfaces of pressure vessels. When the suction pads 330 are released, the system can be moved and attached to other sections of the insulated structure 310.

The three subsystems, namely the IR camera 320, the optional heating source, and the electronics box, are mounted on the chassis clamping structure. The IR camera 320 is the main sensing head and, in one embodiment, is attached to an actuator motor to actuate the movement of the camera 320. This allows the camera 320, for example, to control the image accuracy or field of view by changing the distance from the insulated structure 310. The IR camera 320 can include a thermal detector to sense the temperature gradient, which can be used to identify materials defects in the insulated structure 310. When combined with a prediction module, the identification can include precise characteristics of such defects, including size, shape, length, and depth. The heating source can include flash lamping (or any heating element) to excite the external surface and allow the heating flux to embrace the defect's shape. This enhances the thermal resolution and leads to more accurate predictions through the prediction module.

In an embodiment, the electronics box contains the communication modules and a microcontroller. The electronics box is connected to the IR camera to perform a wireless function and communications with an operator computer. The mode of communication can be through, for example, Wi-Fi, radio frequency (RF), Bluetooth, or Zigbee protocols to achieve two-way data transmission between the detection system and the operator control unit. The wireless communication can also include live video feed, which helps in increasing mobility by avoiding entanglement.

FIG. 4 is an oblique view of an example apparatus 400 for determining metal loss of an insulated structure 410 using thermography and machine learning, according to yet another embodiment of the present invention. The apparatus 400 includes an IR camera 420, four suction pads 430, two slide guides 450, a sliding carrier 460, and four gripper wheels 470. The IR camera 420 includes the thermographic imaging system. In one embodiment, the IR camera 420 includes heat sources for performing active thermography of the insulated structure 410. In the apparatus 400 of FIG. 4, the slide guides 450 are arranged circumferentially about the insulated structure 410. This allows circumferential freedom of movement (along the slide guides 450) for the IR camera 420 (and other subsystems) using the sliding carrier 460 with its gripper wheels 470.

In further detail, while the apparatus 300 in FIG. 3 is somewhat fixed (e.g., circumferentially and longitudinally), the apparatus 400 is designed to be dynamic in movement through gripper wheels 470 and slide guides 450. The detection system uses suction pads 430 with rolling elements (gripper wheels 470, ball casters) to allow touching the insulated pipe 410 (or other insulated structure) during the inspection along the circumference of the insulated structure while the IR camera 320 and detection system is performing a complete scan of the insulated structure 410. This dynamic system concept can be moved, for example, manually through an operator or automatically by motorizing the gripper wheels 470 and controlling the movement remotely. This enables the operator to scan large areas of the insulated structure 410 by utilizing one mechanical configuration and setup. In another embodiment, the slide guides 450 are arranged longitudinally along the insulated structure 410 so that the IR camera 420 has longitudinal freedom of movement.

As will be understood, the apparatus 400, which can be controlled remotely and moved along a structure can include circuitry such as a GPS circuit in order to track its position so that any metal loss that has been corrosion that has been detected, if it amounts to a metal loss determination which meets or exceeds a prescribed threshold amount, can have that location stored for provision (e.g., transmission) to a further robotic device or system for logging the location and the determined metal loss. The threshold amount for comparison can be input and stored in a memory device for reference by a programmed processor making the comparison.

Figure 5A:
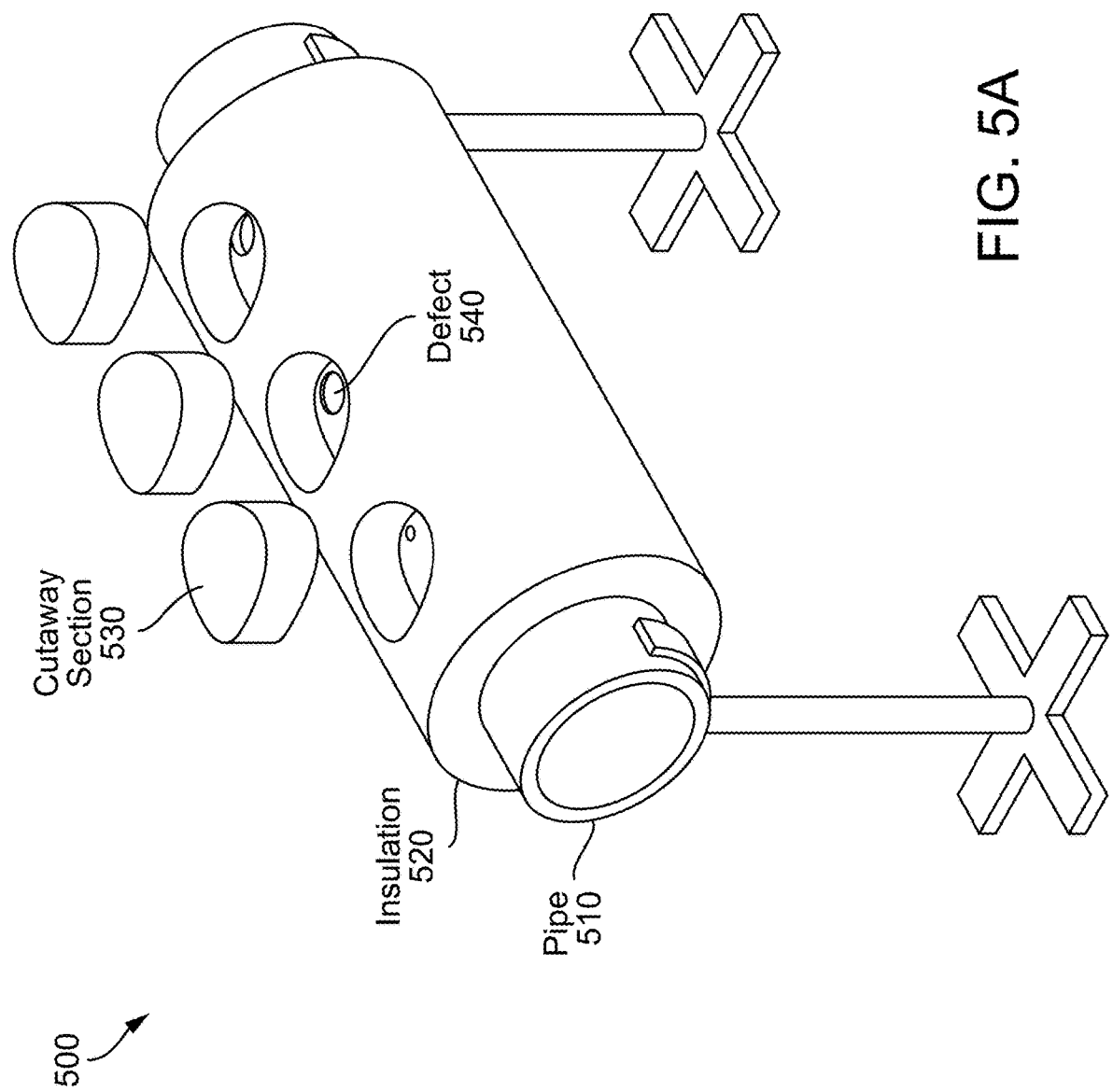
FIGS. 5A-5C are example cutaway views of insulated pipe illustrating a metal pipe having manufactured defects exhibiting different sizes and depths, for training and validating machine learning techniques for determining metal loss based on thermography, according to an embodiment of the present invention.
Figure 5B:
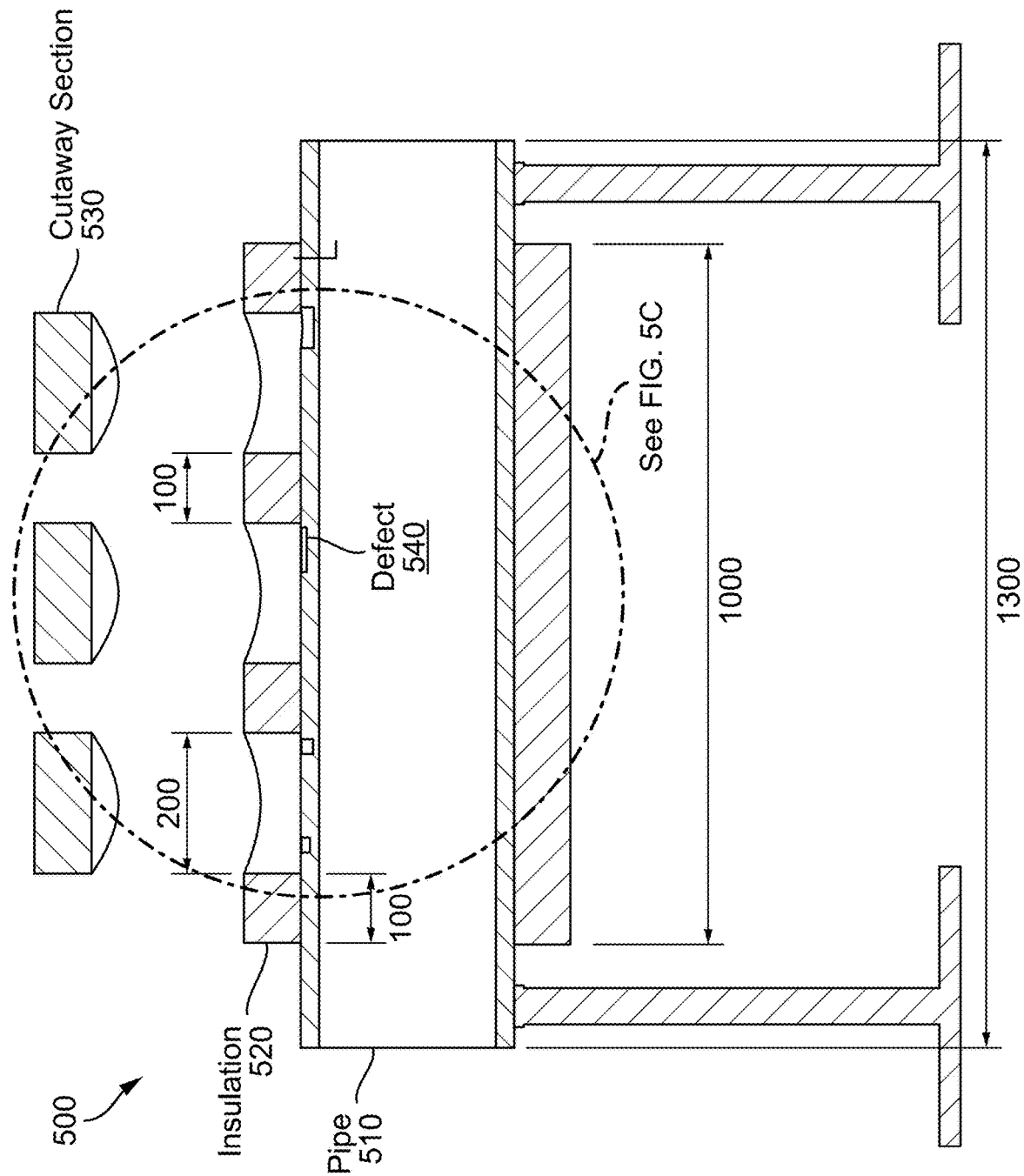
Figure 5C:
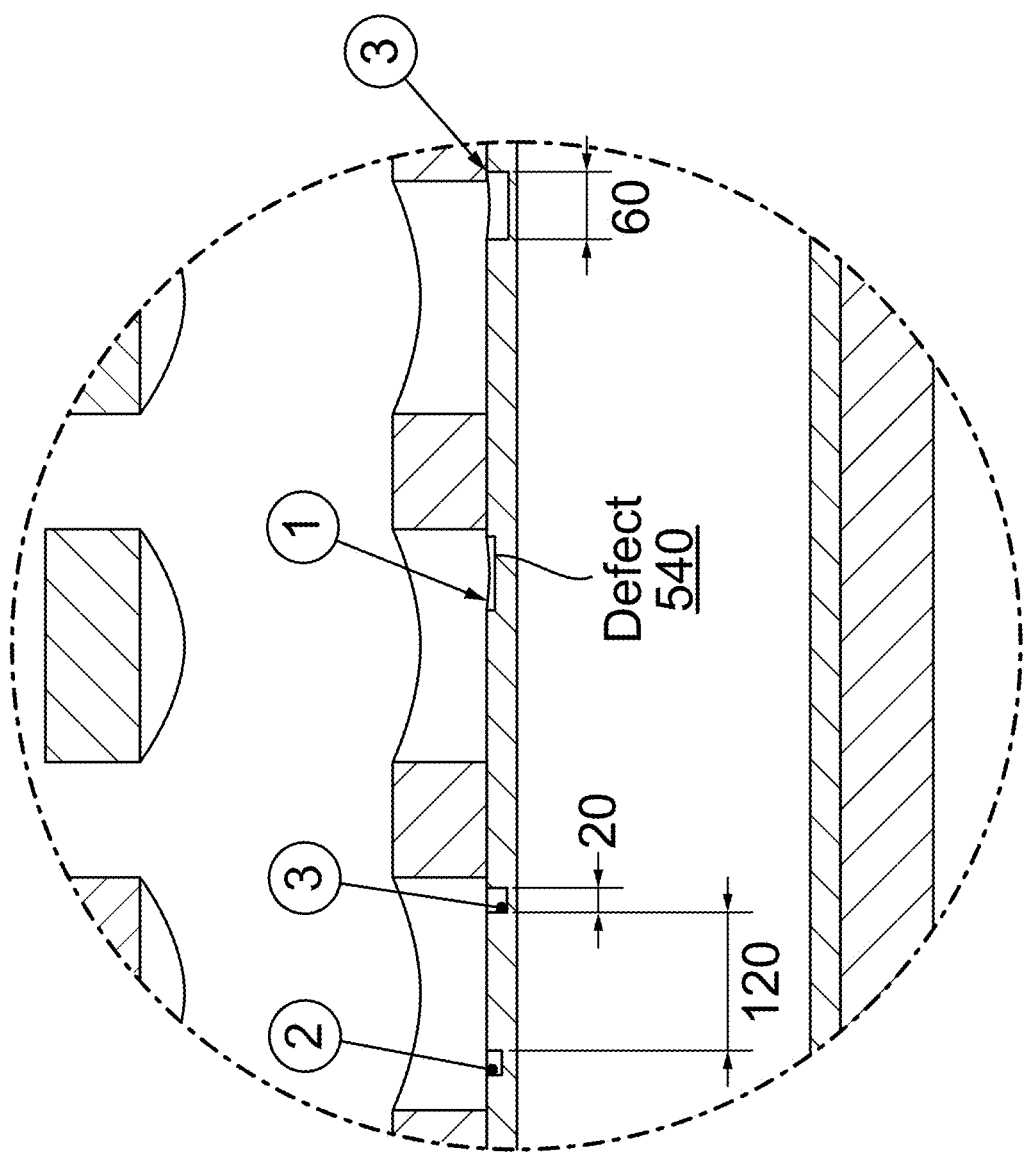

FIGS. 5A-5C are example cutaway views of insulated pipe 500 illustrating a metal pipe 510 having manufactured defects 540 exhibiting different sizes and depths, for training and validating machine learning techniques for determining metal loss based on thermography, according to an embodiment of the present invention. For ease of illustration, three portions (cutaway sections 530) of insulation 520 (and other protective layers) of insulated pipe 500 are shown separated from the remainder of the insulation 520. The cutaway portions 530 each expose one or more defects 540 (such as corroded portions) in the pipe 510. The example measurements (in arbitrary units of length) in FIGS. 5B-5C illustrate example proportions, to give a sense of perspective and scale.

In further detail, the thermal flux deflections for the defects 540 utilized for surface corrosion inspection form thermograms whose signature characteristics are amenable to machine learning techniques. Accordingly, in some embodiments, manufactured defects 540 (of different sizes and depths) are used as input to an expert system module, to train the module to associate defects of certain sizes and depths with their corresponding thermograms. Size can be, for example, one or more of length, width, diameter, and area (such as surface area), to name a few. This machine learning can then be applied through a prediction module that, when presented with new thermograms of insulated pipe, identifies and characterizes (with accurate size and depth approximations) defects in the pipe under the insulation. As such, defect quantification and metal loss detection are automatically performed via a thermographic analysis program based on a machine learning approach installed on a portable device such as a computer or tablet, and wirelessly connected to the inspection apparatus.

By imaging at the defects on the insulted pipe's surface, IR flux deflections can be observed and take the shape of the defects. As such, IR thermography and machine learning can be used in nondestructive surface corrosion inspection. Time-sequenced thermograms or images extracted from the IR video/images can be used as the input data for the machine learning approach. The observed thermal deflections almost take on the exact shape of the defects, providing a sound basis for the detection method. FIG. 5C is the enlarged identified central portion of FIG. 5B. In FIG. 5C, four example defects are shown. The middle defect (i.e., the shallow defect identified as ①) illustrates roughly a 25% loss in wall thickness of the pipe 510. The leftmost defect (i.e., the defect identified as ②) illustrates roughly a 50% loss in wall thickness of the pipe 510. The other two defects (i.e., the deep defects identified as ③) illustrate roughly a 75% loss in wall thickness of the pipe 510. Each of these different depths of wall thickness loss exhibits a different corresponding signature under IR thermography.

FIG. 6, which includes FIGS. 6A-6D, is a set 600 of color thermographic images (or thermograms) of the insulated pipe 500 of FIGS. 5A-5C, illustrating several areas of thermal flux deflection corresponding to the defects 540 shown in FIGS. 5A-5C. FIGS. 6A-6D are taken under active thermography and represent different times and temperature levels of the applied heat (to show different contrasts in the corresponding thermograms). In FIG. 6, the thermal flux deflections simulate and indicate the thermal conductivity heat flow from a hot cycle to a cold cycle around the defects. The color spectrum identifies the areas of heat, with black to white portions identifying relatively cool areas (black being the coldest, about 28° C., white being about 64° C.), blue to red portions indicating relatively warm areas (blue being the colder, about 72° C., red being about 93° C.), and pink indicating the relatively hot portions (warmest, about 100° C.).

Figure 7:
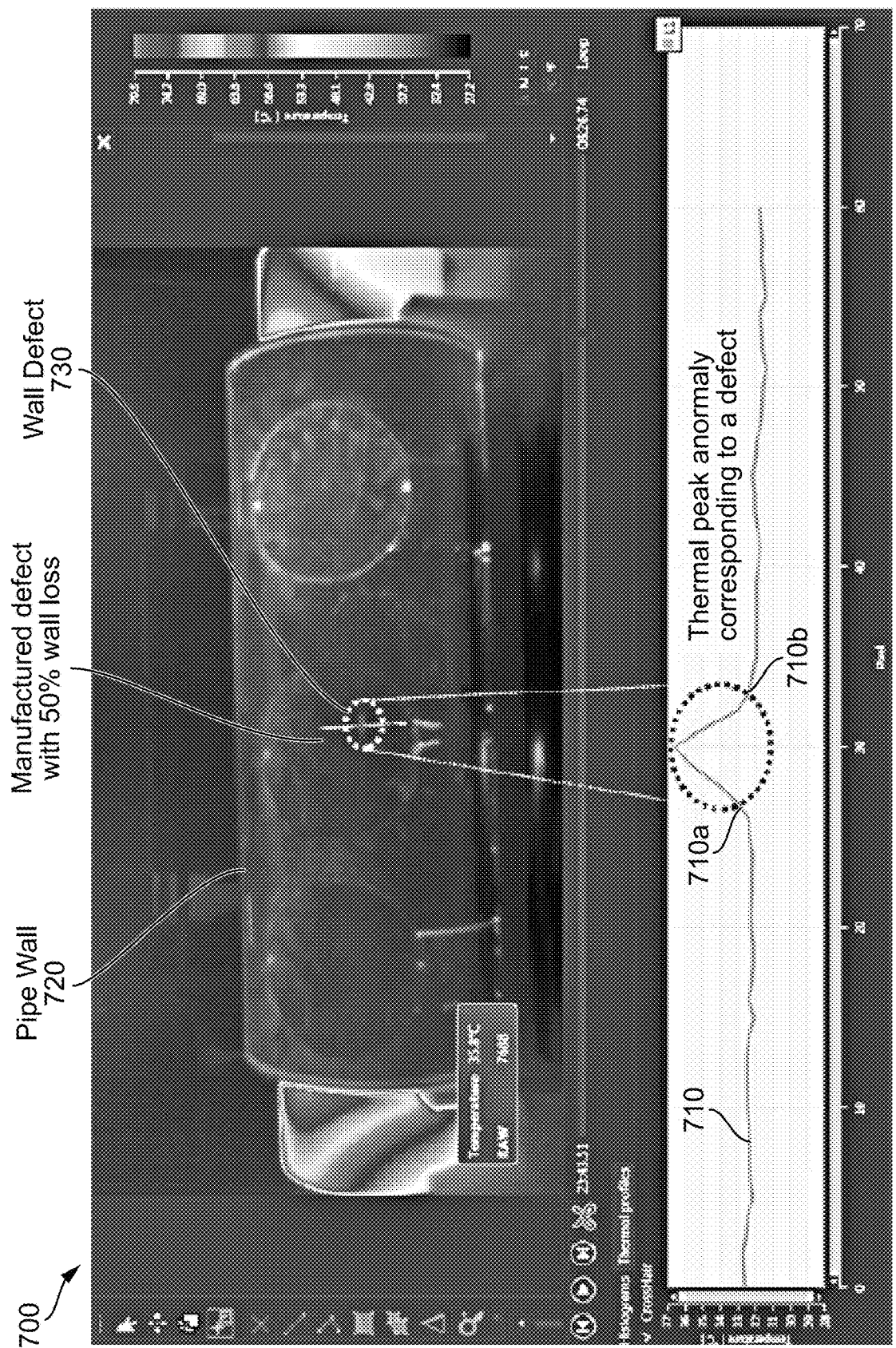
FIG. 7 is a color screen shot of an example thermographic imaging display of an area of insulated pipe showing a thermal peak anomaly corresponding to a defect, for training and validating machine learning techniques for determining metal loss based on thermography, according to an embodiment of the present invention.

FIG. 7 is a color screen shot of an example thermographic imaging display 700 of an area of insulated pipe showing a thermal peak anomaly corresponding to a defect, for training and validating machine learning techniques for determining metal loss based on thermography, according to an embodiment of the present invention. In FIG. 7, the display 700 includes an image at the top of an insulated pipe structure including a pipe wall 720 and a defect 730 in the wall. In addition, the bottom of FIG. 7 includes a temperature graph 710 mapping linear pixel locations of a thermogram to their corresponding temperatures. An area of increased temperature appears in the graph 710 as delineated by points 710a (on the left) and 710b (on the right). This increased temperature area corresponds to a manufactured defect simulating corrosion of 50% wall thickness loss. This increased temperature area corresponds to the wall defect 730. FIG. 7 and similar thermographic data of insulated structures and their corresponding defects are used to train and validate machine learning systems to predict the locations and characteristics of hidden defects in the insulated structures.

In an embodiment, a method for identifying the metal loss caused by corrosion under insulation (CUI) in an insulated structure is provided. The method includes receiving thermograms from the structure using an infrared camera, applying filters to the thermograms using a first machine learning system (e.g., training module, expert system), initially determining a wall loss classification based on output from the filters, and validating the initial wall loss classification by an inspection of the structure. The first machine learning system is trained using results of the validation until a first threshold for CUI wall loss classification accuracy is reached. Outputs of the first machine learning system and additional structural and environmental data are fed into a second machine learning system (e.g., prediction module) that incorporates information from earlier states into current states. The second machine learning system is trained to identify CUI wall loss according to changes in the outputs of the first machine learning system and the additional data over time until a second threshold for CUI wall loss classification accuracy is reached. Metal loss percentage for the scanned area is thereafter identified using the first and second machine learning systems in coordination.

Figure 8:
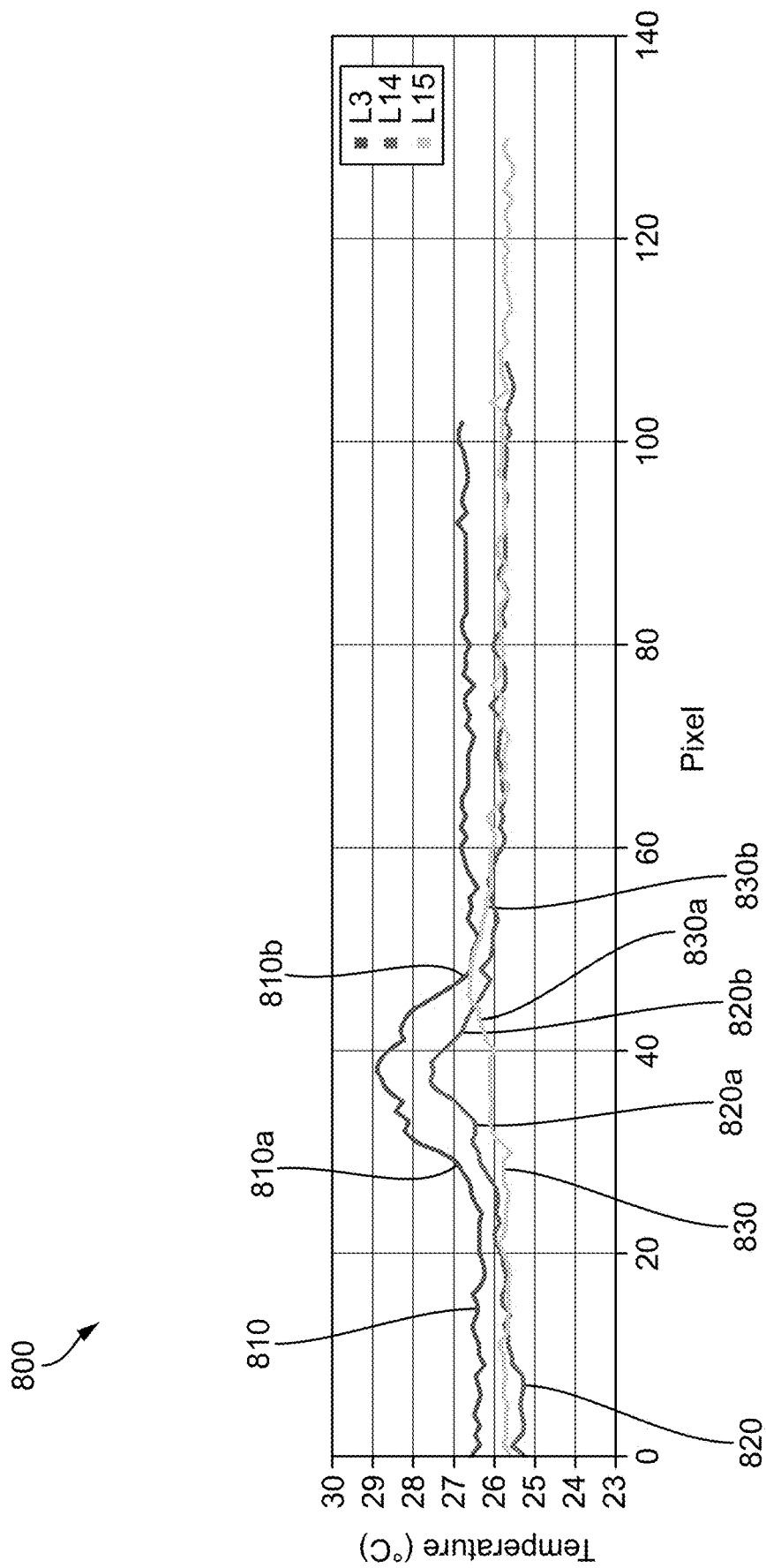
FIG. 8 is a color graph of three overlaid thermal dynamic curves illustrating areas of insulated pipe exhibiting temperature behavior of different manufactured defects for training and validating machine learning techniques for determining metal loss based on thermography, according to an embodiment of the present invention.

FIG. 8 is a color graph 800 of three overlaid thermal dynamic curves illustrating areas of insulated pipe exhibiting temperature behavior of different manufactured defects for training and validating machine learning techniques for determining metal loss based on thermography, according to an embodiment of the present invention. Three different curves are illustrated, similar to the curve at the bottom of FIG. 7. Curve 810 (dark green) represents the thermal activity at and near a manufactured defect having 75% wall thickness loss, with the increased thermal activity delineated by points 810a (on the left) and 810b (on the right). Curve 820 (blue) represents the thermal activity at and near a manufactured defect having 50% wall thickness loss, with the increased thermal activity delineated by points 820a (on the left) and 820b (on the right). Curve 830 (light green) represents the thermal activity at and near a manufactured defect having 25% wall thickness loss, with the increased thermal activity delineated by points 830a (on the left) and 830b (on the right). Each of these curves has a thermal peak anomaly at a location corresponding to a defect. The peak corresponding to the 75% wall thickness loss is significantly higher than the peak corresponding to the 50% wall thickness loss, which is significantly higher than the peak corresponding to the 25% wall thickness loss.

Figure 9A:
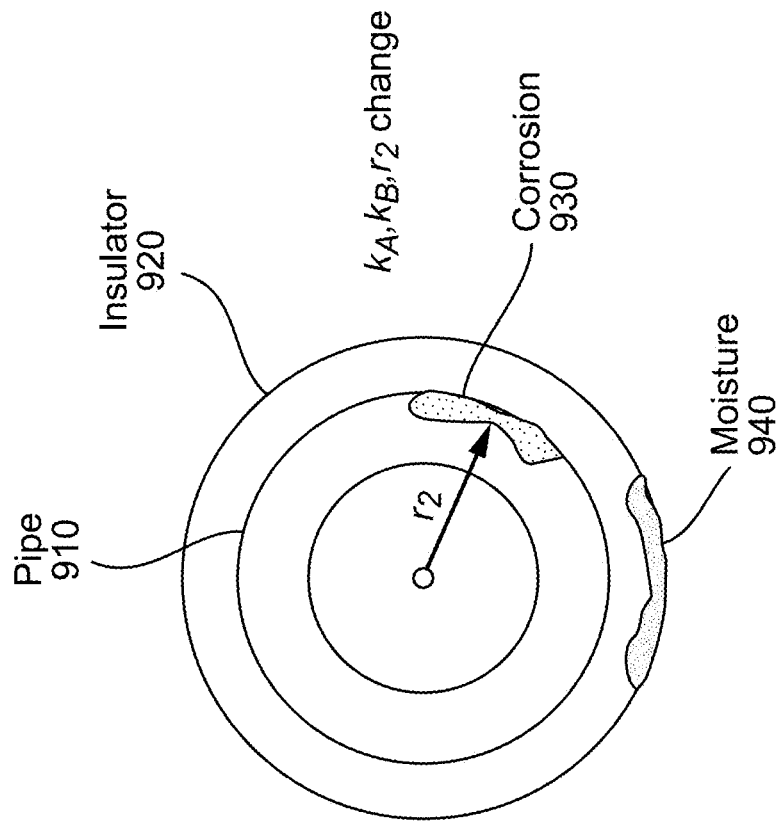

FIGS. 9A-9B are schematic diagrams and thermal equations of an insulted pipe geometry and corresponding equations for the heat transfer rate in the presence of an abnormality for a steady temperature profile on a radial axis of the pipe. FIG. 9A identifies what each of the variables represents. FIG. 9A also illustrates a simplified cross-sectional view of an insulated pipe, identifying the significant aspects being modeled or inspected including a pipe 910, insulator (or insulation) 920, corrosion 930 of the pipe 910, and moisture 940 accumulated in the insulation 920. In particular, the radius of the pipe ($r_2$, including wall thickness), thermal conductivity of the pipe ($k_A$), and thermal conductivity of the insulation ($k_B$) vary for different areas of the cross section depending on factors such as the corrosion 930 and moisture 940.

FIG. 9B shows a similar cross-sectional view of the insulated pipe, with radii and temperatures at varying locations: inside the pipe ($r_1$, $T_1$), outside the pipe/inside the insulation ($r_2$, $T_2$), outside the insulation ($r_3$, $T_3$), and an arbitrary location in the pipe (r, T). The letters A and B are also used to refer to the pipe and the insulation, respectively, in the variables. FIG. 9B further includes formulas and equations useful in analyzing the thermodynamics of the insulated pipe phenomena discussed throughout this application.

The corrosion rates and the metal loss are calculated based on mass loss data for the targeted location over time. In some embodiments, the methodology includes thermography combined with machine learning, for measuring, identifying, and learning the thermal conditions leading to undesired or compromised effects. These effects include corrosion under insulation, defects in the pipe wall, and wet areas in the insulation. Each of these effects has a different thermal signature appearing in thermograms. By measuring, identifying, and learning these thermal conditions, accurate predictions can be made to when other areas are experiencing (or will soon experience) such effects. IR thermography is an effective method to detect thermal gradient when an insulator is compromised, such as from wet insulation and/or defects in the pipe or insulation. From these thermal signatures, corresponding metal loss percentages for different defects can be estimated accurately using a machine-learning model with predefined defect conditions learned from earlier training.

The above and other embodiments confer many benefits to addressing problems related to CUI and other metal loss in insulated metal structures. For example, while water and moisture spots can dry easily without being detected in time, when frequently monitored (such as continuously), vulnerable locations that confine water and moisture spots can be identified by analyzing IR images. In addition, annual inspection plans can be implemented according to the monitoring outcomes and image processing results. Because of their nondestructive aspects and amenability to automated operation, these techniques can be intrinsically safe for determining and monitoring insulated structures. In some embodiments, real-time monitoring is performed, not just occasional surveying. This real-time monitoring can allow filming of the CUI creation in all conditions to which the insulated structures are likely to be exposed.

Furthermore, many of the proposed techniques need no sophisticated equipment and require little human intervention. Nonetheless, these techniques perform challenging image processing and data interpretation. These techniques use scientific evidence-based monitoring and detection by interpreting data (e.g., data-based analysis). As such, these techniques can eliminate or significantly reduce manual inconsistency that can take place. The resulting tool from this thermography and machine learning combination can provide a simple yet valuable approach: monitor insulated structures and predict locations of present (or future) defects.

Further, when the temperature in the structure (e.g., pipe) is substantially different (higher or lower) than the ambient temperature (which is usually the case for insulated structures storing or transporting fluids), the IR evaluation method performs well. In addition, anomalies found by IR thermography and machine learning can be further evaluated using pulsed eddy current (PEC) testing, providing for a correlative approach. Moreover, these IR techniques have the potential to detect insulation failures and icing under weather jacket in cold applications, which can be more critical locations.

According to some embodiments, IR thermography is combined with machine learning through time-based monitoring to provide a nondestructive technique for identifying and characterizing defects in an insulated structure, such as an insulated pipe. These defects might otherwise go undetected until more serious consequences result. The techniques are cost effective since stripping and replacing the insulation to otherwise inspect the pipe can be expensive and time-consuming. The techniques provide for simple and informative methods and apparatuses for indicating the presence of water or moisture in insulated structures, plus information can be acquired for the pipe's surface geometry to indicate and characterize the corrosion and pipe's wall thickness.

It is to be understood that any structural and functional details disclosed herein are not to be interpreted as limiting the systems and methods, but rather are provided as example embodiments and/or arrangements for helping teach one of ordinary skill in the art one or more ways to implement the systems or methods.

The methods described herein may be performed by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes may be made, and equivalents may be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

What is claimed is:

1. A method for inspection of a first insulated structure, the method comprising:
    acquiring, by an infrared camera, first thermograms of a first outer surface of the first insulated structure;
    determining, by a prediction circuit, a first wall thickness loss of a first defect in a first metal wall of the first insulated structure using the first thermograms, the first metal wall being underneath a first insulation layer of the first insulated structure, the first insulation layer corresponding to the first outer surface; and
    outputting, by the prediction circuit, the first wall thickness loss, wherein
    the prediction circuit is built from training data using a machine learning process,
    the training data comprises second thermograms of a second outer surface of a second insulated structure having at least three distinct known second wall thickness losses of a corresponding at least three second defects in a second metal wall of the second insulated structure, the second metal being underneath a second insulation layer of the second insulated structure, the second insulation layer corresponding to the second outer surface, and the method further comprises:
    determining, by a prediction circuit, a first size of the first defect using the first thermograms, the first size comprising one or more of a length, a width, and an area; and
    outputting, by the prediction circuit, the first size, wherein
    the at least three second defects have a corresponding at least three distinct known second sizes, the second sizes each comprising one or more of a length, a width, and an area.

2. The method of claim 1, further comprising:
    moving, by gripper wheels, the infrared camera from a first location on the first outer surface corresponding to the first thermograms, to a second location on the first outer surface different from the first location, the gripper wheels being attached to the infrared camera and in adhesive contact with the first outer surface; and
    acquiring, by the infrared camera, third thermograms of the second location.

3. The method of claim 2, further comprising:
    determining, by the prediction circuit, a third wall thickness loss of a third defect in the first metal wall using the third thermograms, the third wall thickness loss being different from the first wall thickness loss; and
    outputting, by the prediction circuit, the third wall thickness loss.

4. The method of claim 2, wherein moving the infrared camera comprises:
    autonomously moving the infrared camera along the first outer surface in a circumferential or longitudinal direction.

5. The method of claim 1, further comprising:
    heating, by a heat source, some of the first outer surface prior to acquiring some of the first thermograms, the heat source being attached to the infrared camera.

6. The method of claim 1, wherein the first insulated structure comprises:
    a pipe including the first metal wall; and
    a cladding layer coinciding with or underneath the first outer surface, wherein
    the first insulating layer is underneath the cladding layer.

7. A method for inspection of a first insulated structure, the method comprising
    acquiring, by an infrared camera, first thermograms of a first outer surface of the first insulated structure;
    determining, by a prediction circuit, a first wall thickness loss of a first defect in a first metal wall of the first insulated structure using the first thermograms, the first metal wall being underneath a first insulation layer of the first insulated structure, the first insulation layer corresponding to the first outer surface; and
    outputting, by the prediction circuit, the first wall thickness loss, wherein
    the prediction circuit is built from training data using a machine learning process,
    the training data comprises second thermograms of a second outer surface of a second insulated structure having at least three distinct known second wall thickness losses of a corresponding at least three second defects in a second metal wall of the second insulated structure, the second metal being underneath a second insulation layer of the second insulated structure, the second insulation layer corresponding to the second outer surface, and the machine learning process comprises:
    applying, by a training circuit, filters to the second thermograms;
    determining, by the training circuit, wall thickness loss classifications of the at least three second defects based on output from the filters; and
    validating, by the training circuit, the wall thickness loss classifications using the known second wall thickness losses.

8. The method of claim 7, wherein the machine learning process further comprises:
    outputting, by the training circuit, the validated wall thickness loss classifications; and
    building, by a machine learning circuit, the prediction circuit from the validated wall thickness loss classifications.

9. A system for inspection of a first insulated structure, the system comprising:
    an infrared camera for acquiring first thermograms of a first outer surface of the first insulated structure; and
    a prediction circuit for
        determining a first wall thickness loss of a first defect in a first metal wall of the first insulated structure using the first thermograms, the first metal wall being underneath a first insulation layer of the first insulated structure, the first insulation layer corresponding to the first outer surface, and outputting the first wall thickness loss, wherein
the prediction circuit is built from training data using a machine learning process, and
the training data comprises second thermograms of a second outer surface of a second insulated structure having at least three distinct known second wall thickness losses of a corresponding at least three second defects in a second metal wall of the second insulated structure, the second metal being underneath a second insulation layer of the second insulated structure, the second insulation layer corresponding to the second outer surface,
wherein the system further comprises a heat source for heating some of the first outer surface prior to acquiring some of the first thermograms, the heat source being attached to the infrared camera.

10. The system of claim 9, further comprising:
gripper wheels for moving the infrared camera from a first location on the first outer surface corresponding to the first thermograms, to a second location on the first outer surface different from the first location, the gripper wheels being attached to the infrared camera and in adhesive contact with the first outer surface, wherein
the infrared camera is further for acquiring third thermograms of the second location.

11. The system of claim 10, wherein the prediction circuit is further for:
determining a third wall thickness loss of a third defect in the first metal wall using the third thermograms, the third wall thickness loss being different from the first wall thickness loss; and
outputting the third wall thickness loss.

12. The system of claim 10, wherein the gripper wheels are further for:
autonomously moving the infrared camera along the first outer surface in a circumferential or longitudinal direction.

13. The system of claim 10, further comprising:
a sliding carrier for attaching the infrared camera to the gripper wheels;
slide guides for guiding movement of the sliding carrier along the first outer surface in a circumferential or longitudinal direction; and
suction pads for stabilizing the slide guides with respect to the first outer surface.

14. The system of claim 9, wherein the prediction circuit is further for:
determining a first size of the first defect using the first thermograms, the first size comprising one or more of a length, a width, and an area; and
outputting the first size, wherein
the at least three second defects have a corresponding at least three distinct known second sizes, the second sizes each comprising one or more of a length, a width, and an area.

15. The system of claim 9, wherein
the first insulated structure comprises a pipe including the first metal wall,
the first insulated structure comprises a cladding layer coinciding with or underneath the first outer surface, and
the first insulating layer is underneath the cladding layer.

16. The system of claim 9, further comprising a training circuit for:
applying filters to the second thermograms;
determining wall thickness loss classifications of the at least three second defects based on output from the filters; and
validating the wall thickness loss classifications using the known second wall thickness losses.

17. The system of claim 16, wherein
the training circuit is further for outputting the validated wall thickness loss classifications, and
the system further comprises a machine learning circuit for building the prediction circuit from the validated wall thickness loss classifications.

18. The system of claim 9, further comprising:
a wireless communication device for communicating between the infrared camera and the prediction circuit, the wireless communication device being attached to the infrared camera.

19. A system for inspection of a first insulated structure, the system comprising:
an infrared camera for acquiring first thermograms of a first outer surface of the first insulated structure; and
a prediction circuit for
determining a first wall thickness loss of a first defect in a first metal wall of the first insulated structure using the first thermograms, the first metal wall being underneath a first insulation layer of the first insulated structure, the first insulation layer corresponding to the first outer surface, and
outputting the first wall thickness loss, wherein
the prediction circuit is built from training data using a machine learning process, and
the training data comprises second thermograms of a second outer surface of a second insulated structure having at least three distinct known second wall thickness losses of a corresponding at least three second defects in a second metal wall of the second insulated structure, the second metal being underneath a second insulation layer of the second insulated structure, the second insulation layer corresponding to the second outer surface,
wherein the system further comprises gripper wheels for moving the infrared camera from a first location on the first outer surface corresponding to the first thermograms, to a second location on the first outer surface different from the first location, the gripper wheels being attached to the infrared camera and in adhesive contact with the first outer surface,
wherein the infrared camera is further for acquiring third thermograms of the second location, and
wherein the system further comprises:
a sliding carrier for attaching the infrared camera to the gripper wheels;
slide guides for guiding movement of the sliding carrier along the first outer surface in a circumferential or longitudinal direction; and
suction pads for stabilizing the slide guides with respect to the first outer surface.

20. The system of claim 19, wherein the prediction circuit is further for:
determining a third wall thickness loss of a third defect in the first metal wall using the third thermograms, the third wall thickness loss being different from the first wall thickness loss; and
outputting the third wall thickness loss.

21. The system of claim 19, wherein the gripper wheels are further for:

autonomously moving the infrared camera along the first outer surface in a circumferential or longitudinal direction.

\* \* \* \* \*